United States Patent
Chander et al.

(10) Patent No.: US 6,778,828 B1
(45) Date of Patent: Aug. 17, 2004

(54) PERSONAL MOBILITY REGISTRATION SYSTEM FOR REGISTRATION OF A USER'S IDENTITY IN A TELECOMMUNICATIONS TERMINAL

(75) Inventors: Sharat Subramaniyam Chander, Woodridge, IL (US); Jan Oudelaar, Huizen (NL); Charles C Teising, Jr., Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/548,072

(22) Filed: Apr. 12, 2000

Related U.S. Application Data (60) Provisional application No. 60/128,852, filed on Apr. 12, 1999.

(51) Int. Cl.[7] ................................................ H04Q 7/20
(52) U.S. Cl. ................................ 455/435.1; 455/435.2; 455/410; 455/411; 455/418; 455/429; 455/558; 455/419; 380/247
(58) Field of Search .............................. 455/435, 410, 455/411, 418, 429, 558, 419, 435.1, 435.2; 380/242

(56) References Cited

U.S. PATENT DOCUMENTS

| | | | |
|---|---|---|---|
| 5,890,075 A | 3/1999 | Cyr et al. | 455/460 |
| 5,918,172 A * | 6/1999 | Saunders et al. | 455/404 |
| 5,933,773 A * | 8/1999 | Barvesten | 455/411 |
| 6,198,823 B1 * | 3/2001 | Mills | 380/247 |
| 6,208,853 B1 * | 3/2001 | LoVasco et al. | 455/414 |
| 6,393,298 B1 * | 5/2002 | Fulton | 455/551 |

FOREIGN PATENT DOCUMENTS

| | | | |
|---|---|---|---|
| DE | 19511031 | 10/1996 | G06K/19/07 |
| EP | 0734143 | 9/1996 | H04M/15/00 |
| WO | WO9853629 | 11/1998 | H04Q/7/32 |

* cited by examiner

*Primary Examiner*—Erika Gary
*Assistant Examiner*—David Nguyen (57) ABSTRACT

A system is provided for securely registering a new user's personal mobility information in a communications terminal having existing registrations. The terminal owner provides information needed to verify the owner's identity and authorizes registration of a specific new user identified by the new user's IMSI. The new user also provides information needed to verify the new user's identity, and requests the registration. A user identity module verifies the identity information provided by the terminal owner and new user, and through intermediaries including a serving system, negotiates with the new user's home system (home location register) to obtain subscription information and appropriate security information for the new user to permit system access. Registration is accomplished by storing this information in the user identity module. Advantageously, all negotiation occurs over the normal interface by which the terminal communicates with the serving system, and the serving system and home system need not be of the same family. The new registration may supplement or supersede one or more existing registrations.

12 Claims, 6 Drawing Sheets

PERSONAL MOBILITY REGISTRATION SYSTEM FOR REGISTRATION OF A USER'S IDENTITY IN A TELECOMMUNICATIONS TERMINAL

CROSS REFERENCES TO RELATED APPLICATIONS

This application claims priority of provisional application Ser. No. 60/128,852, filed Apr. 12, 1999.

FIELD OF THE INVENTION

This application relates to telecommunications systems, and more particularly to the registration of a user's identity or a user's service subscription in a user-identity component of a telecommunications terminal.

BACKGROUND OF THE INVENTION

Many modern telecommunications systems provide various services and features to which users may subscribe with a service provider, prior to using the services. When a user accesses a telecommunications system, the system requires some means to identify the user or the user's subscription, in order to determine that the user is authorized to receive service from the system and to provide the specific services and features which are associated with the user or the user's subscription. In many wireline telecommunications systems, such as those providing conventional wired telephone service, the solution to this problem is straightforward: the user's subscription information for an ordinary telephone line is usually associated in some way with the line (or some other fixed interconnection with the telecommunications network). In such systems, calls originating on a line are billed to, and receive features and other treatment appropriate for, the associated subscription. Calls directed to a subscriber are delivered to the associated line, unless the subscriber has arranged through call forwarding or other means to have the call redirected.

Identifying a user or a user's subscription in telecommunications systems serving wireless terminals is less straightforward. Users and their terminals may seek service at various locations within their "home" system, at locations in other systems of the same type or family, or in systems of a different type or family. Even within a home system, calls originated by wireless subscribers do not typically enter the system from respective identifiable "lines" or other fixed interconnection points, and similarly calls destined for wireless subscribers cannot be delivered consistently to respective lines or other fixed interconnection points. (A user's home system is the telecommunications system with which the user has a subscription or other arrangement under which service is provided, and the system which maintains information sufficient to authenticate the user and determine the parameters of service to be provided to the user. The term "system family" is used herein to refer to one or more telecommunications systems that share a defined set of telecommunications technologies, protocols, functional behaviors, and/or conformance with one or more official standards, industry standards, or other conventions.) Accordingly, wireless terminals have historically been provided with information that identifies the terminal itself, a subscription associated with the terminal, or both. This information, or a derivative, is transmitted to a serving telecommunications system when access is sought and perhaps at other times. If the serving system is the subscriber's home system, the serving system may already have information sufficient to authenticate the user and determine the parameters of service to be provided to the user. In other cases, the serving system may request this information from the subscriber's home system.

For example, in original versions of the AMPS system, an early cellular system implemented in North America, each mobile terminal had a fixed Electronic Serial Number (ESN) and a changeable Mobile Identification Number (MIN), which included the directory number assigned by the home system to the subscription and the associated terminal. See, for example, Cellular Interim Standard 3 (CIS-3), a publication of the Telecommunications Industry Association (TIA). This arrangement has a number of disadvantages. When a terminal requests access to a system, the terminal transmits its associated ESN and MIN to the serving system in the clear, i.e., without encryption. This has allowed persons to steal service by recording the ESN and MIN of valid terminals/subscribers and reprogramming impostor terminals to mimic the terminals of valid subscribers. In addition, at least initially, although a terminal's MIN was changeable by a service provider or other technical personnel, it was not readily changeable by a subscriber. Thus, terminals were associated with a particular subscription for service, and were not equipped to obtain access to a user-selected one of several valid subscriptions associated with the user.

Newer systems have introduced several improvements in the identification of a user or a user's subscription to a serving system. Terminals for AMPS systems have been produced that can request access under different MINs associated with several valid (but predetermined) subscriptions responsive to a user selection. In GSM wireless systems, each terminal has a Subscriber Identity Module (SIM), which contains information identifying a subscriber, and associated security information, which are necessary to obtain access to a GSM system. The SIM is removable from GSM terminals, allowing a SIM associated with a different existing subscription, and perhaps of a different subscriber, to be inserted into the terminal to obtain service under such subscription. The SIM, as used in the GSM system, is described in ETS 300 922, Digital Cellular Telecommunications System; Subscriber Identity Modules (SIM); Functional Characteristics (GSM 02.17 version 5.0.1), April 1997, a publication of the European Telecommunications Standards Institute. However, as the size of wireless terminals has generally decreased, removable SIMs have become undesirable because the ability of a user to conveniently handle the SIM establishes a limit on the degree to which the SIM may be miniaturized.

Other systems employ "Shared Secret Data" possessed by both the wireless terminal and the serving system to authenticate the user or subscription associated with the wireless terminal. Cyr et al. U.S. Pat. No. 5,890,075 discloses a method for remotely updating the shared secret data stored in a mobile terminal by a wireless communications system over the air interface. In such systems, only derivatives of the shared secret data are transmitted over the air, such that an observer of the over-the-air messages cannot, without other secret information, derive the actual shared secret data required to obtain access to the system.

Some prior art systems provide for remotely updating security information associated with an existing user or an existing subscription, and other systems allow a user to select a particular subscription among several existing subscriptions to use for making and receiving calls. However, the prior art systems lack the ability to provide other desirable registration services.

For example, a first wireless terminal owner and service subscriber may desire to authorize a second person to use the wireless terminal under the second person's own subscription. Although terminals adapted for use in a GSM system may have removable SIMs by which a terminal may be selectably associated with a respective predefined subscription corresponding to each SIM, simply exchanging SIMs is unsatisfactory. Most terminals for systems other than GSM do not have removable SIMs, and GSM terminals are adapted for use only with SIMs from GSM systems, precluding use of the terminal by subscribers of other system families. Moreover, during the period the first subscriber's SIM has been replaced by the second subscriber's SIM, the first subscriber loses access to the terminal under that user's subscription. Accordingly, the first subscriber would not be able to use the terminal to make calls under that subscription, and calls intended for the first subscriber would not be delivered to the terminal during that period, unless the first subscriber had made special arrangements for such delivery (for example, by a call forwarding arrangement to the second subscriber).

The present inventors have realized that none of the prior art systems enable a user to remotely register a new user identity or new subscription identity in a wireless terminal via the system's over-the-air interface. For the purpose of this application, "registration" means installing into a telecommunications terminal identity or security information for a user or a user's subscription.

Accordingly, the need exists for a telecommunications system which enables a user to remotely register a new user identity or new subscription identity in a telecommunications terminal via the interface by which the terminal and the system normally communicate.

OBJECTS AND SUMMARY OF THE INVENTION

It is therefore an object of the invention to provide a telecommunications network, and methods for use therewith, which minimize the aforementioned disadvantages of prior art systems.

According to an embodiment of the present invention, a personal mobility registration system (PMRS) is provided for use in conjunction with a telecommunications network and terminals therefor. The PMRS comprises apparatus and/or associated methods for registering a new user's identity and security information in a telecommunications terminal, based both on information supplied and input by the new user, and on information transferred to the terminal through the interface by which the terminal and the telecommunications network normally communicate. The term "new user" refers to a user whose identity and security information are not currently registered in the terminal.

The term "telecommunications network" is used here to refer to either a single telecommunications system or a plurality of telecommunications systems which are suitably interconnected to cooperate for call completion and administrative functions, as is known in the art. The terminal owner's subscription may be associated with a first "home" system. The new user's subscription may be associated with a second "home" system. The terminal may be located in a region served by a third "serving" system. In some cases, all three of these systems may be distinct, and in other cases one or more of these functionally described systems may actually be the same system (e.g., the new user and the terminal owner may be associated with the same home system). Where the systems are distinct, they need not be members of the same system family.

Each PMRS-equipped terminal includes a user identity module (UIM) which contains and is responsible for maintaining user identity and security information for at least one registered user, who is assumed to be the terminal owner. The UIM may be removable or non-removable, and may be a distinct component or may be an integrated part of the terminal. In order for a new user to become registered in a PMRS-equipped terminal, the terminal owner must authorize the new registration. The terminal owner enters an appropriate terminal function code (or otherwise requests the terminal to begin the authorization process). The terminal prompts the terminal owner for the owner's own identification and security code information, an identification of the new user, an indication of whether the new user registration is to replace any prior registration or be in addition thereto, and optionally, a validity period for the new user registration. The UIM verifies the information supplied by the terminal owner and indicates whether the attempted authorization was successful.

If the attempted authorization was successful, the terminal then prompts the new user for that user's identification and security code information. The UIM transmits a message via the serving system's air interface (or other interface in a non-wireless system) to the new user's home system requesting the home system provide certain security information needed to register the new user's identity or subscription in the UIM of the terminal. The telecommunications network forwards the message, with appropriate inter-system translations where required, to the home system of the new user. The home system then negotiates with the UIM of the terminal to exchange authentication key generation information, such that upon completion, the home system and the UIM possess a matching set of authentication keys for the new user. The home system and the UIM may employ well-known methods of exchanging key generation information, and calculating actual keys. Once the UIM possesses a suitable authentication key for the new user, registration of the new user information in the terminal is complete.

BRIEF DESCRIPTION OF THE DRAWINGS

These and other features of the invention will be best understood by reference to the following detailed description of a preferred embodiment of the invention, taken in conjunction with the accompanying drawings, in which.

DETAILED DESCRIPTION OF THE PREFERRED EMBODIMENTS

Figure 1:
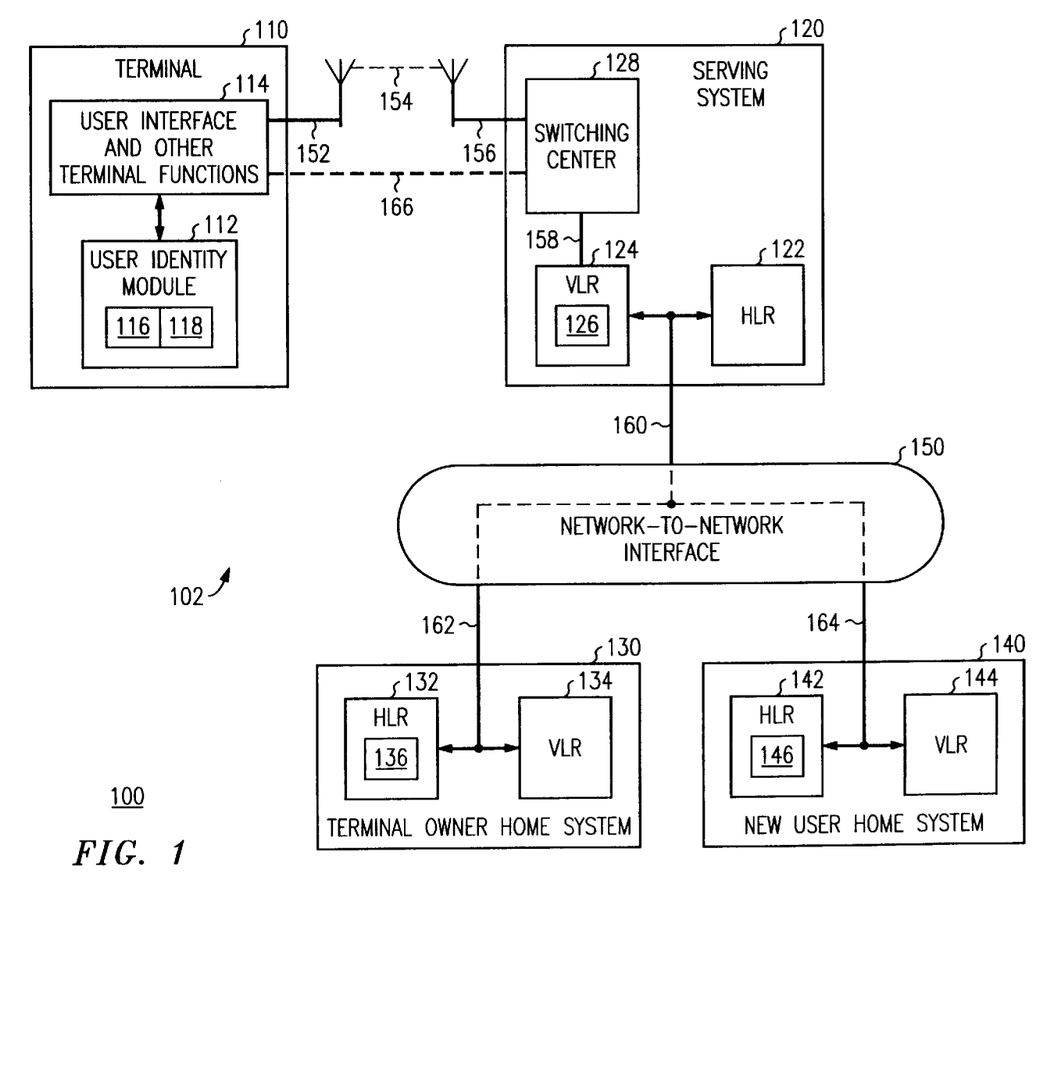
FIG. 1 is a block diagram of a telecommunications network equipped with a preferred embodiment of a personal mobility registration system constructed according to the present invention.

FIG. 1 is a block diagram of a telecommunications network 102 equipped with a preferred embodiment 100 of a personal mobility registration system (PMRS) constructed according to the present invention.

The present application relates to telecommunications systems. It will be appreciated that in the telecommunications arts, various signal leads, busses, data paths, data structures, channels, buffers, and other communications paths may be used to implement a facility, structure, or method for conveying information or signals, and are often functionally equivalent. Accordingly, unless otherwise noted, references to apparatus or data structures for conveying a signal or information are intended to refer generally to all functionally equivalent apparatus and data structures.

Telecommunications network 102 may be constructed in a manner generally similar to other known telecommunications networks, but with certain components added, and other components modified, to provide the functions of PMRS 100, as further described herein. As best seen in FIG. 1, network 102 comprises first, second, and third telecommunications systems 120, 130, and 140, respectively, each of which may operate self-sufficiently for originating and terminating calls within the respective systems, and each may be considered an independent telecommunications subnetwork. A telecommunications terminal 110 is adapted for communicating directly with telecommunications system 120.

The systems or sub-networks 120, 130, and 140 may be constructed to employ any suitable telecommunications technologies, protocols, or functional behaviors, and may be members of any system families now known or to be developed. The term "system family" is used herein to refer to one or more telecommunications systems that share a defined set of telecommunications technologies, protocols, functional behaviors, and/or conformance with one or more official standards, industry standards, or other conventions. By virtue of such sharing, some level of direct interoperability may be provided between terminal equipment and infrastructure equipment of the same family, and some level of direct interoperability may be provided between telecommunications systems or infrastructures of the same family. For example, each of systems or subnetworks 120, 130, and 140 may be members of any of the system families commonly referred to as GSM, TDMA, CDMA, or AMPS, and standardized in:

GSM: GSM 01.02: Digital Cellular Telecommunications System (Phase 2+); General Description of a GSM Public Land Mobile Network (PLMN); a publication of the European Telecommunications Standards Institute;

TDMA: TIA/EIA IS-136, 800 MHz TDMA Cellular-Radio Interface-Mobile Station-Base Station Compatibility; a publication of the Telecommunications Industry Association;

CDMA: TIA/EIA IS-95-A, Mobile Station—Base Station Compatibility Standard for Dual-Mode Wideband Spread Spectrum Cellular System, Rev. A; a publication of the Telecommunications Industry Association;

AMPS: ANSI TIA/EIA-553A, Cellular Systems Mobile Station—Base Station Compatibility Specification, a publication of the American National Standards Institute.

Systems or subnetworks 120, 130, and 140 are preferably connected to one another by a suitable network-to-network interface (NNI) 150, forming a larger telecommunications network 102. NNI 150 functions to provide an interoperable connection among the systems or subnetworks for both message content traffic (such as voice signals and user data signals) and administrative traffic (such as call signaling, user authentication, and billing information). Although a single NNI 150 to which several telecommunications systems or subnetworks are connected is shown in FIG. 1, it will be appreciated that any pair of systems could also be interconnected by a point-to-point signal path (not shown) with a suitable network-to-network interface (not shown) interposed therein.

Where all interconnected systems are of the same family or have the same network-side public interface, NNI 150 may simply be a facility for transmission of administrative traffic and user message content traffic among systems. Where interconnected systems are of differing families, NNI 150 may provide translations between the formats of the administrative traffic and user message content traffic required by the respective systems. Alternatively, NNI 150 may be implemented as a transmission and switching facility for administrative traffic and user message content traffic which conforms to a defined common interface format. In that case, each system connected to the NNI 150 would be responsible for translating administrative and user message content traffic between that system's native format and the defined common interface format of the NNI 150. For example, NNI 150 may be implemented using the standardized intersystem operations protocol known as ANSI-TIA/EIA 41-D: Cellular Radiotelecommunications Intersystem Operations, a publication of the American National Standards Institute.

As best seen in FIG. 1, telecommunications systems or subnetworks 120, 130, and 140 have specific functional roles in the context of the exemplary embodiment of the inventive PMRS 100, and these roles will hereafter be used in referring to the systems. System 120 functions as a serving system for terminal 110 and is responsible for direct communications with terminal 110. System 130 functions as the home system of the owner of terminal 110 (or other user already registered in the terminal), and is responsible for, inter alia, maintaining on a primary basis the subscription information and authentication information relating to the telecommunications service of the terminal owner (or other user already registered in the terminal). System 130 may be referred to as the Terminal Owner Home System (TOHS). System 140 functions as the home system of a new user who desires to register his or her identity in terminal 110 so that he or she may use terminal 110 to make and receive calls (or access other services) under a subscription arrangement with system 140. New user home system (NUHS) 140 is responsible for, inter alia, maintaining on a primary basis the subscription information and authentication information relating to the new user's telecommunications service.

Serving system (SS) 120 comprises a home location register (HLR) 122, a visiting location register (VLR) 124, and a switching center 128. Switching center 128 is connected to VLR 124 via data path 158 and to HLR 122 via another data path (not shown). HLR 122 and VLR 124 are connected to each other and to NNI 150 via data path 160. The data paths shown herein are simplified for clarity to indicate the logical flow of information relevant to the present invention, but are not intended to illustrate the physical organization of the telecommunications system 120. However, the design and construction of telecommunications systems suitable for use as serving system 120 is known in the art, and such systems are commercially available from several manufacturers.

For example, serving system 120 could be implemented using the Autoplex/Flexent wireless telecommunications system, a product of Lucent Technologies Inc., 600 Mountain Avenue, Murray Hill, N.J. 07974-0636. Switching center 128 could be implemented using the 5ESS-2000 digital switching system, also a product of Lucent Technologies Inc. The functions of the VLR 122, the HLR 124, and the switching center 128 in a telecommunications system are generally known in the art, and therefore only those features required to provide the functions of PMRS 100 will be described. Although FIG. 1 depicts the HLR, VLR, and switching system in serving system 120 as single, individual units, it will be appreciated that the functions of all could be implemented in a single physical unit and that the functions of any could be distributed among plural physical units. As is known in the art, serving system 120 may also include other components, which are not germane to the invention and are not described here.

Figure 4:
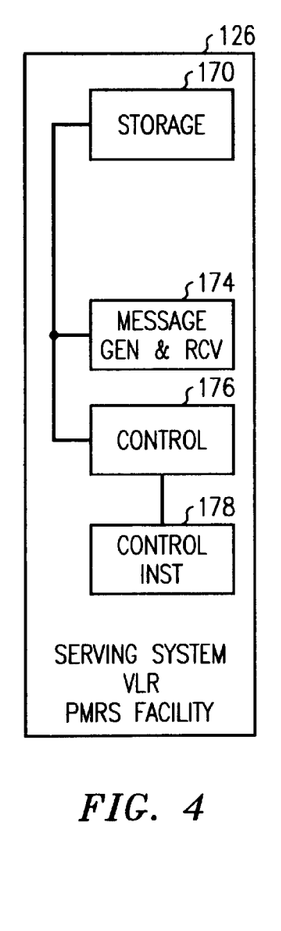
FIG. 4 is a block diagram of a facility housed in the visiting location register of a serving system for providing certain functions required to implement the personal mobility registration service in the network of FIG. 1.

VLR 124 includes a VLR PMRS facility 126 which provides several functions required to implement the PMRS 100. As best seen in FIG. 4, facility 126 includes storage 170 for a local copy of subscription and authentication information for each user who has been registered in a terminal using the PMRS. Facility 126 further comprises a message relay 174 including temporary storage for messages to be relayed between the terminal 110 and TOHS 130 or NUHS 140. Where necessary, message relay 174 also reformats or regenerates messages to be sent or which arrive in a format or protocol different from that of the serving system's native format or protocol. Facility 126 also includes a control 176 and suitable control instruction storage 178 for coordinating the operation of the subscription storage, the message relay, and the temporary:storage. Although VLR PMRS facility 126 and its components are shown as distinct objects in the figures, the components and resources of facility 126 could also be integrated with the components and resources used by VLR 124 to provide the other functions customarily provided by a VLR.

As best seen in FIG. 1, a telecommunications terminal 110 is adapted for direct communications with serving system 120. Terminal 110 comprises a main functions module 114 which provides a user interface, an interface to serving system 120, facilities for exchanging message content traffic (such as voice or data signals) with the user and for encoding and decoding such traffic and exchanging it with serving system 120, facilities for establishing a communications connection and for negotiating other administrative operations with serving system 120.

Terminal 110 further comprises a user identity module (UIM) 112 including a control 116 and storage 118. The UIM 112 maintains security and subscription information for one or more users who have registered their identity in terminal 110 using PMRS 100. The UIM 112 receives messages or other signals from the main functions module 114 relating to security and subscription information, and updates its storage as necessary to provide desired functions. When the main functions module 114 informs the UIM 112 that a terminal owner or new user has requested registration of the new user in the terminal 110, UIM 112 manages collection of user identification and security code information, and originates and receives messages exchanged between the terminal 110 and other components of telecommunications network 102 necessary to accomplish the registration. This process is described further in greater detail in connection with FIGS. 2a–2b and 3a–3b. Control 116 thus functions as a message generator and receiver, and as a user subscription and security storage 118 updating component.

The UIM 112 may be removable or non-removable. Although the UIM 112 is depicted in FIG. 1 as a distinct component of terminal 110, UIM 112 may also be implemented as an integrated part of the main functions module 114. UIM 112 may be implemented using any suitable storage and control technology. For example, UIM 112 may be implemented as a micro-processor based smart card of the types generally disclosed in Suhir U.S. Pat. No. 5,703,350, Bartholomew et al. U.S. Pat. No. 5,724,417, or Clifton et al. U.S. Pat. No. 5,719,437. Other types of smart cards, and other non-smart-card implementations of UIM 112 could also be used.

As best seen in FIG. 1, terminal 110 and serving system 120 are linked by a suitable communications facility. For example, the communications facility may be implemented using a radio link 154, as is known in the art, employing a terminal-side radio transceiver 152 and a serving-system-side radio transceiver 156, each compatible with the air interface of serving system 120. Although the systems 120, 130, 140, and the terminal 110 of telecommunications network 102 are generally described herein in the context and terminology of known wireless or mobile telecommunications systems, the inventive PMRS 100 may also be used with telecommunications terminals and systems of other types. In particular, the PMRS 100 may also be used to advantage in telecommunications systems in which the terminal is fixed and/or in which the terminal and the system are connected via wire, fiber, or other generally fixed interconnection facilities, as depicted by link 166.

As best seen in FIG. 1, the TOHS 130 comprises an HLR 132, a VLR 134, and a switching center (not shown). HLR 132 and VLR 134 are connected to each other and to NNI 150 via data path 162. The data paths shown herein are simplified for clarity to indicate the logical flow of information relevant to the present invention, but are not intended to illustrate the physical organization of the telecommunications system 130. However, the design and construction of telecommunications systems suitable for use as TOHS 130 is known in the art, and such systems are commercially available from several manufacturers.

For example, TOHS 130 could be implemented using the Autoplex/Flexent wireless telecommunications system, a product of Lucent Technologies Inc., 600 Mountain Avenue, Murray Hill, N.J. 07974-0636. The functions of the VLR 132, and the HLR 134 in a telecommunications system are generally known in the art, and therefore only those features required to provide the functions of PMRS 100 will be described. Although FIG. 1 depicts the HLR and VLR in TOHS 130 as single, individual units, it will be appreciated that the functions of all could be implemented in a single physical unit and that the functions of any could be distributed among plural physical units. As is known in the art, TOHS 130 may also include other components, which are not germane to the invention and are not described here.

Figure 5:
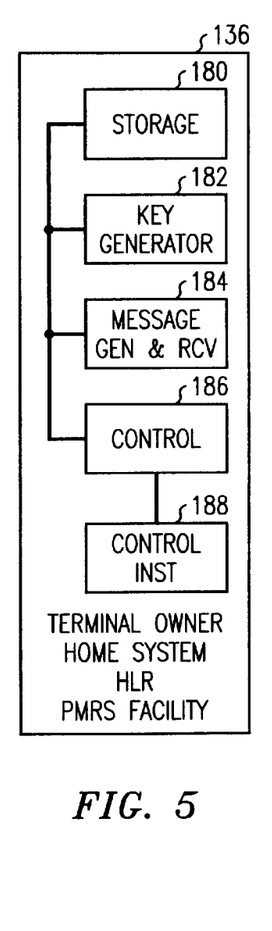
FIG. 5 is a block diagram of a facility housed in the home location register of a terminal owner's home system for providing certain functions required to implement the personal mobility registration service in the network of FIG. 1.

TOHS HLR 132 includes a TOHS HLR PMRS facility 136 which provides several functions required to implement the PMRS 100. Typically, HLR 132 includes the functions of an authentication center; such HLRs are sometimes designated HLR/AC or HLR/AUC. Hereafter, references to a home location register (HLR) are intended to include HLRs providing the authentication center function, where applicable, and are also intended to include standalone authentication centers, where applicable. As best seen in FIG. 5, facility 136 includes storage 180 for a primary copy of subscription and authentication information for each subscriber of TOHS 130, including the owner of terminal 110. Facility 136 also includes a key generator 182 for generating a key (which may include primary and secondary keys) used to authenticate a user, based in part on information received from the user and/or the terminal 110. Facility 136 further comprises a message generator and receiver 184 including temporary storage for messages. Where necessary, message generator and receiver 184 also reformats or regenerates messages to be sent or which arrive in a format or protocol different from that of the native format or protocol of the TOHS 130. Facility 136 also includes a control 186 and suitable control instruction storage 188 for coordinating the operation of the subscription storage, the key generator, the message generator and receiver, and the temporary storage. Although TOHS HLR PMRS facility 136 and its components are shown as distinct objects in the figures, the components and resources of facility 136 could also be integrated with the components and resources used by HLR 132 to provide the other functions customarily provided by an HLR.

As best seen in FIG. 1, the NUHS 140 comprises an HLR 142, a VLR 144, and a switching center (not shown). HLR 142 and VLR 144 are connected to each other and to NNI 150 via data path 164. The data paths shown herein are simplified for clarity to indicate the logical flow of information relevant to the present invention, but are not intended to illustrate the physical organization of the telecommunications system 140. However, the design and construction of telecommunications systems suitable for use as NUHS 140 is known in the art, and such systems are commercially available from several manufacturers.

For example, NUHS 140 could be implemented using the Autoplex/Flexent wireless telecommunications system, a product of Lucent Technologies Inc., 600 Mountain Avenue, Murray Hill, N.J. 07974-0636. The functions of the HLR 142, and the VLR 144 in a telecommunications system are generally known in the art, and therefore only those features required to provide the functions of PMRS 100 will be described. Although FIG. 1 depicts the HLR and VLR in NUHS 140 as single, individual units, it will be appreciated that the functions of all could be implemented in a single physical unit and that the functions of any could be distributed among plural physical units. As is known in the art, NUHS 140 may also include other components, which are not germane to the invention and are not described here.

Figure 6:
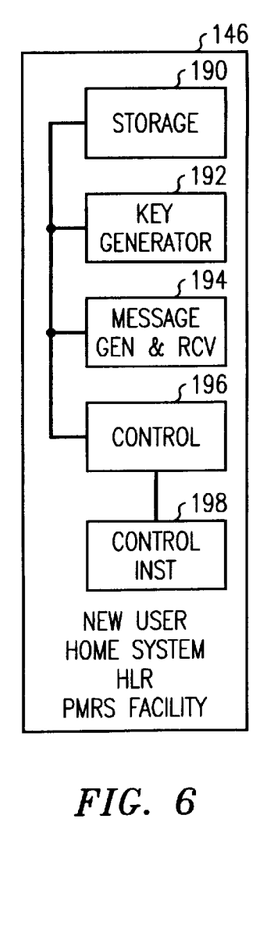
FIG. 6 is a block diagram of a facility housed in the home location register of a terminal owner's home system for providing certain functions required to implement the personal mobility registration service in the network of FIG. 1.

NUHS HLR 142 includes a NUHS HLR PMRS facility 146 which provides several functions required to implement the PMRS 100. Typically, HLR 142 includes the functions of an access controller; such HLRs are sometimes designated HLR/AC. As best seen in FIG. 6, facility 146 includes storage 190 for a primary copy of subscription and authentication information for each subscriber of NUHS 140, including the new user desiring to register his or her identity in terminal 110. Facility 146 also includes a key generator 192 for generating a key (which may include primary and secondary keys) used to authenticate a user, based in part on information received from the user and/or the terminal 110. Facility 146 further comprises a message generator and receiver 194 including temporary storage for messages. Where necessary, message generator and receiver 194 also reformats or regenerates messages to be sent or which arrive in a format or protocol different from that of the native format or protocol of the NUHS 140. Facility 146 also includes a control 196 and suitable control instruction storage 198 for coordinating the operation of the subscription storage, the key generator, the message generator and receiver, and the temporary storage. Although NUHS HLR PMRS facility 146 and its components are shown as distinct objects in the figures, the components and resources of facility 146 could also be integrated with the components and resources used by HLR 142 to provide the other functions customarily provided by an HLR.

For purposes of explanation of an exemplary embodiment of the invention, each of the systems 120, 130, and 140 are described herein as distinct from one another, and as noted above, each may be a member of any suitable known system family. However, the functions of any two or more of systems 120, 130, and 140 could be provided by a single system. For example, if both the terminal owner and the new user have service subscription arrangements with the same system, that one system would function as both the terminal owner home system (TOHS) 130 and NUHS 140. In that case, the explicit interconnection and network-to-network interface between those systems would be unnecessary. Although telecommunications network 102 is depicted as comprising three systems or subnetworks, any number of additional systems may be present in the network 102.

Figure 2A:
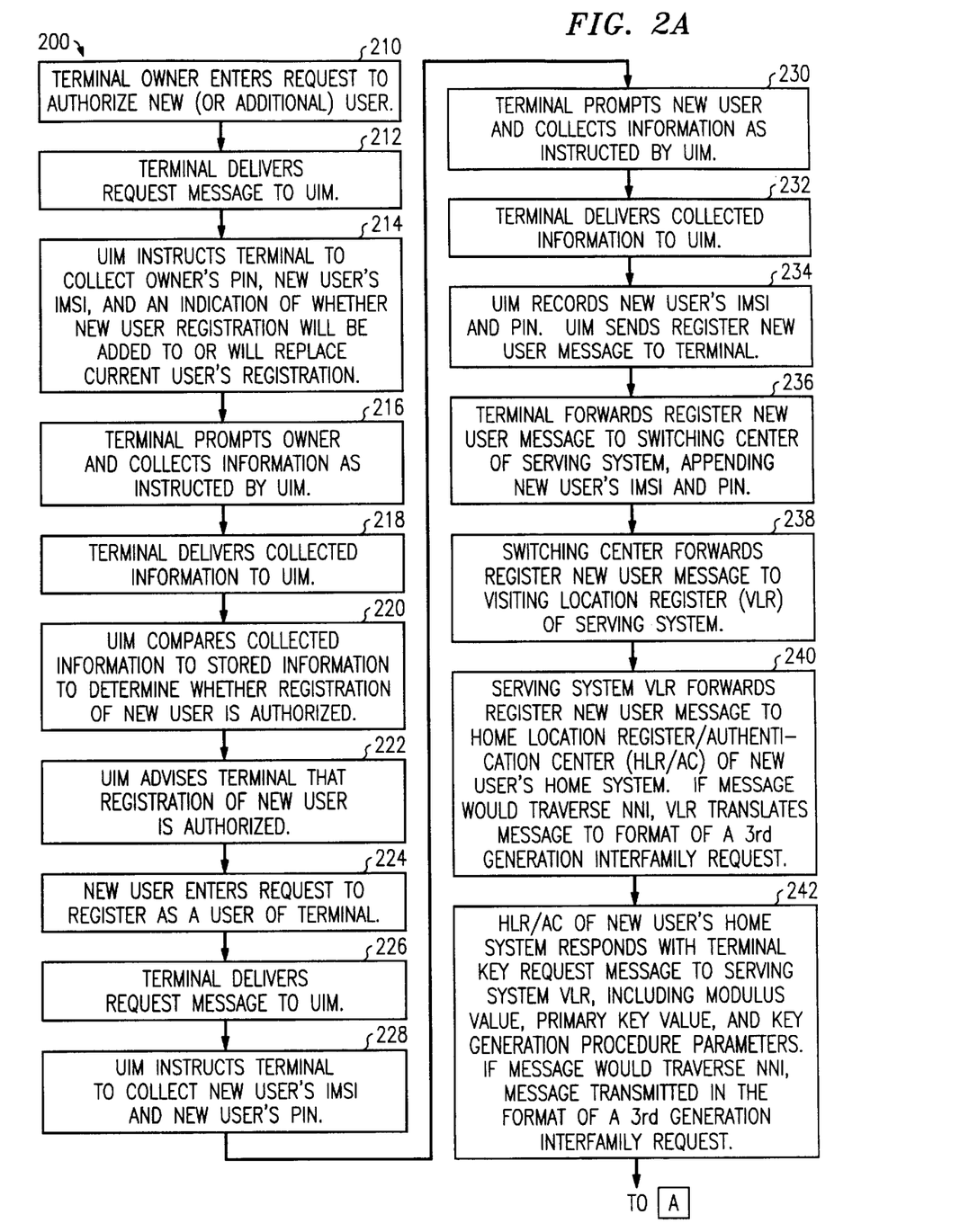
FIGS. 2a and 2b form a flow diagram depicting a method for use in conjunction with the invention for registering a new user identity in a telecommunications terminal and telecommunication network of FIG. 1.
Figure 2B:
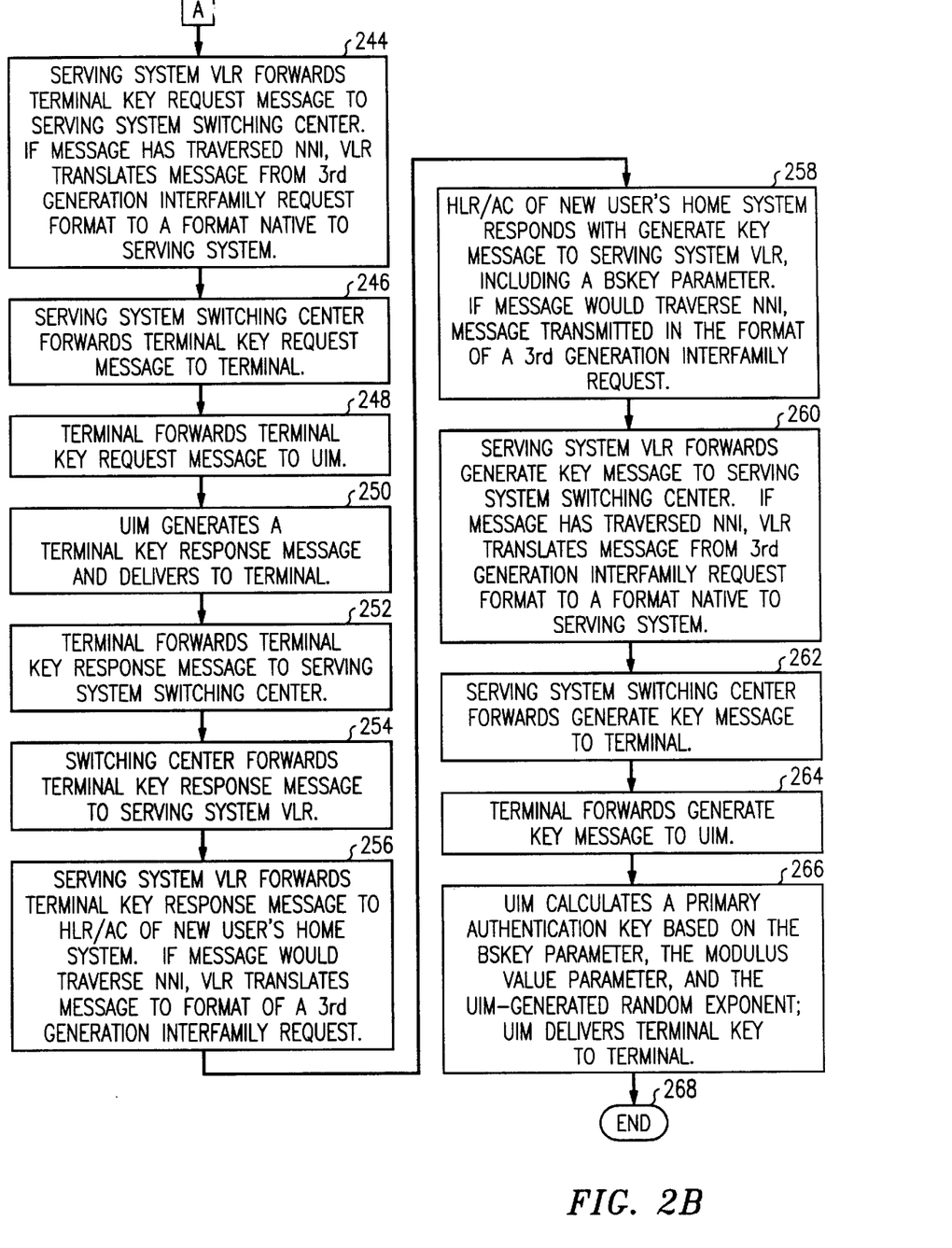
Figure 3:
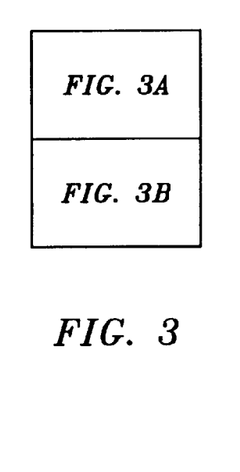
FIGS. 3a–3b form a message flow diagram depicting a communication between a telecommunications terminal, an associated user identity module, a serving system, and a home system, for registering a user identity in conjunction with the system and method of FIGS. 1, 2a, and 2b.
Figure 3A:
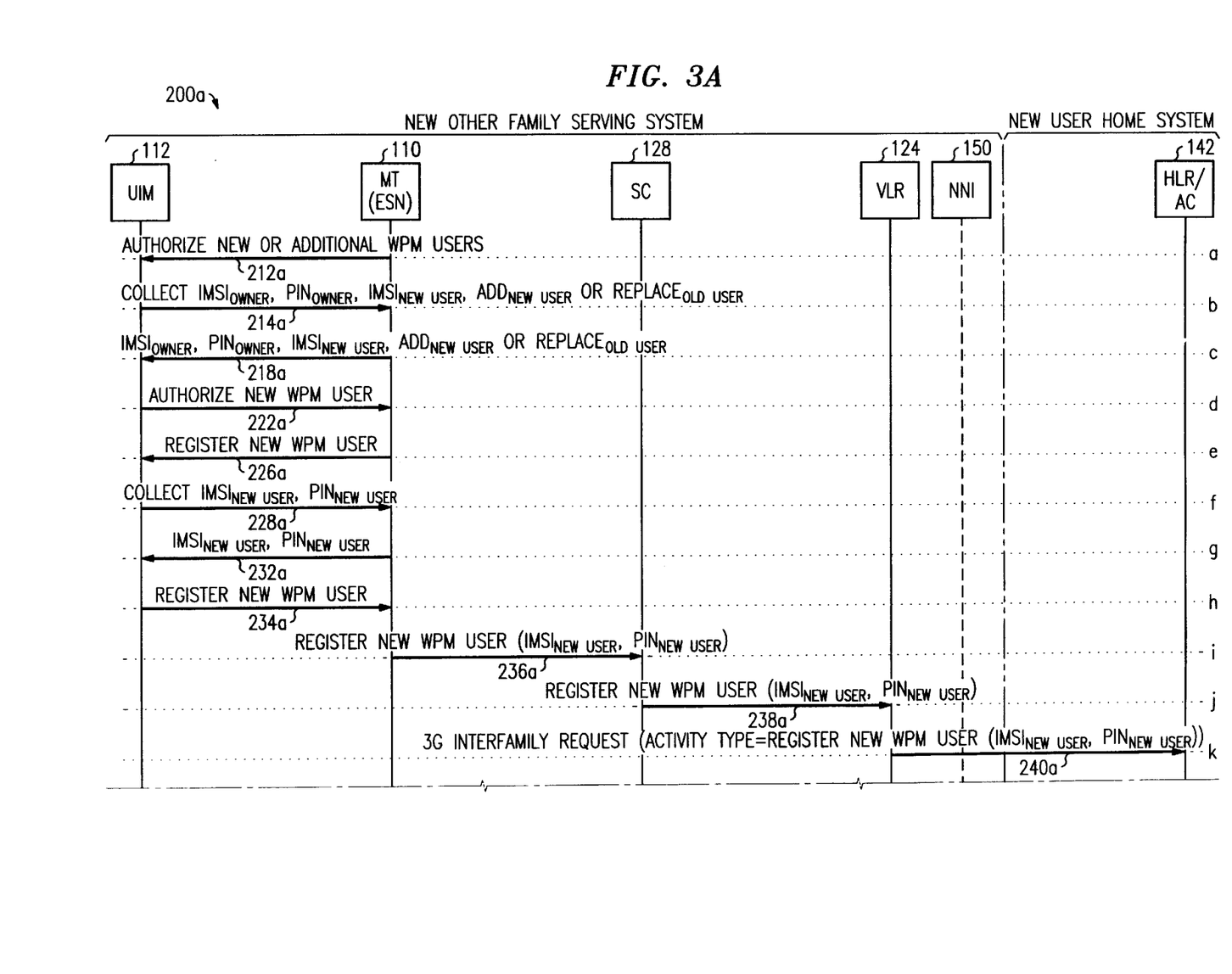
Figure 3B:
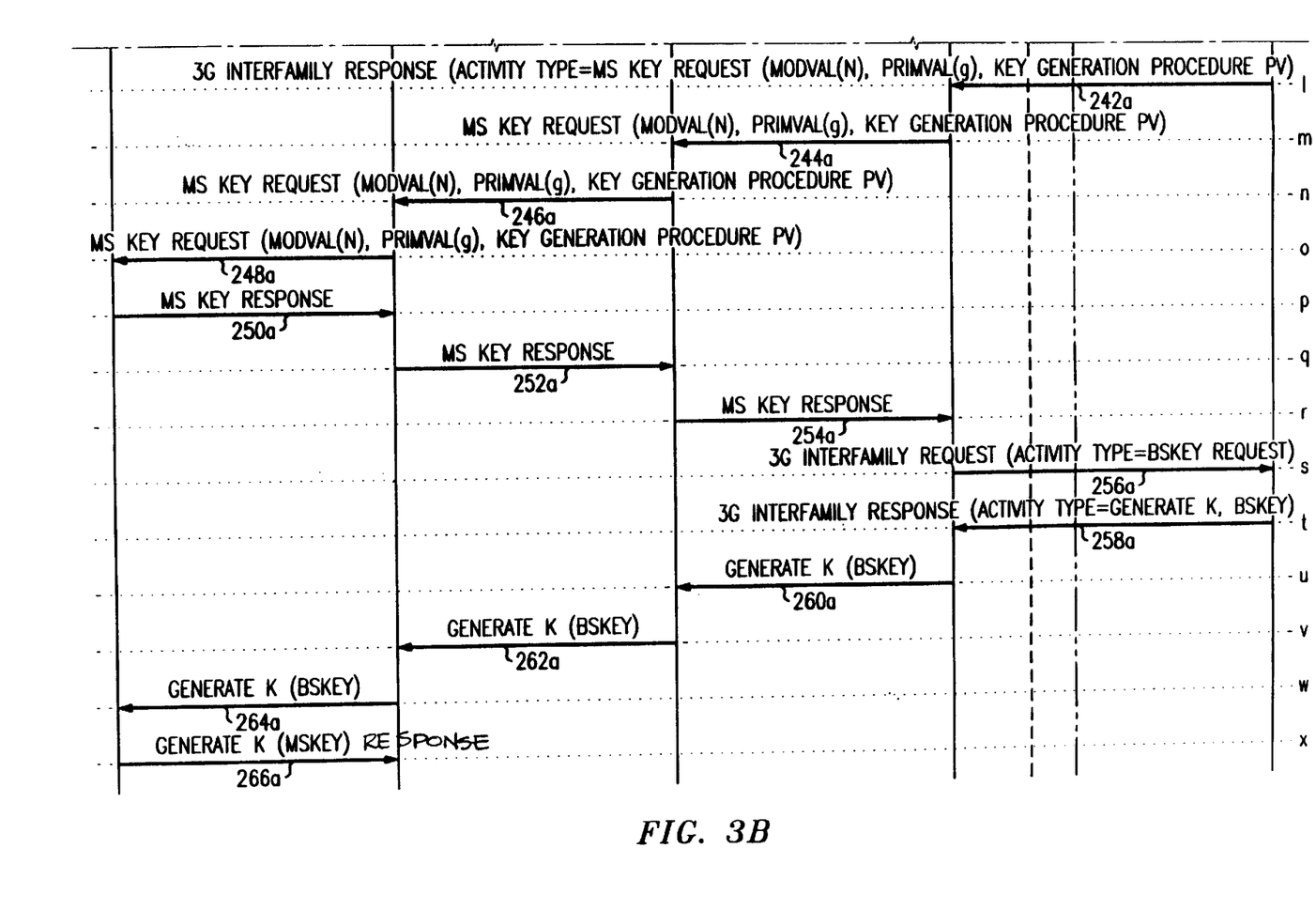

FIGS. 2a–2b form a flow diagram depicting a method 200 for use in conjunction with the PMRS 100 for registering a new user identity in the telecommunications terminal 110 (FIG. 1) and telecommunication network 102 (FIG. 1). FIGS. 3a–3b form a message flow diagram depicting a series 200a of communications between a telecommunications terminal, an associated user identity module, a serving system, and a home system, for registering a user identity in conjunction with the system 100 (FIG. 1) and method 200 (FIGS. 2a–2b). FIGS. 2a–2b and 3a–2b may be best understood if considered together. Reference characters in the range 200–299 with no letter suffix refer to a step of method 200 and are shown in FIGS. 2a–2b; the same reference characters with a letter suffix refer to respective corresponding messages of message flow 200a and are shown in FIGS. 3a–3b.

Method 200 begins with step 210, in which the owner of terminal 110 employs the user interface of the terminal to enter a request to authorize the registration of a new user in terminal 110. The request may, for example, be entered by the user by typing a function code into the keyboard of the terminal. The new user registration may be an addition to the existing registrations for terminal 110, or the new user registration may replace one or more existing registrations for terminal 110, as selected by the terminal owner in a further step. In step 212, the terminal 110 (by way of component 114) delivers the request as a message 212a to the user identity module (UIM) 112 of the terminal. The term "message" as used in conjunction with FIGS. 2–3 may include flags, semaphores, signals, pulses, or other any other indicia functionally equivalent to a message.

In step 214, the UIM instructs the terminal 110 via message 214a to collect from the terminal owner information to verify identity of the terminal owner (including the owner's International Mobile Subscriber Identifier (IMSI) and the owner's personal identification number (PIN)), information identifying the new user for whom registration is to be authorized (including the new user's IMSI), and an indication of the terminal owner's choice as to whether the new registration is to be added to, or replace, one or more existing registrations. The information used to verify the identification of the terminal owner may, for example, take the form of digits entered by the terminal owner to specify the IMSI and PIN. However, other forms of information capable of securely verifying a user identity, including finger prints, voice prints, iris images, and the like, could also be used. Optionally, the terminal owner may elect deletion of an existing registration without adding a new registration. In step 216, the terminal prompts the owner for, and collects the required information. In step 218, the terminal delivers the collected information to the UIM via message 218b.

In step 220, the UIM compares the collected information to information stored in storage 118 to determine whether the terminal owner provided correct identity verification information. If the terminal owner did not provide correct verification information, the method 200 is terminated (not shown), and the terminal returned to normal operation. In that case, terminal 110 may display a message (not shown) to the user indicating that verification of the identity of the terminal owner failed. If the terminal owner did provide correct verification information, in step 222 the UIM advises the terminal via message 222b that registration of the new user has been successfully authorized by the terminal owner. Also in step 222, the UIM also records for later use in storage 118 the new user's IMSI as one for which registration is authorized.

In step 224, the new user employs the user interface of the terminal to enter a request to register the user's identity in the terminal. The request may, for example, be entered by the user by typing a function code into the keyboard of the terminal. In step 226, the terminal delivers the request as a message 236a to the UIM 112. In step 228, the UIM instructs the terminal 110 via message 228a to collect identity verification information from the new user (including the new user's IMSI and PIN). In step 230, the terminal prompts the new user for, and collects, the required information. The information used to verify the identification of the new user may, for example, take the form of digits entered by the user to specify the IMSI and PIN. However, other forms of information capable of securely verifying a user identity, including finger prints, voice prints, iris images, and the like, could also be used. In step 232, the terminal delivers the collected information to the UIM via message 232b.

In step 234, the UIM compares the collected information to information stored in storage 118 (step 218) to determine whether the new user's IMSI is one for which registration has been authorized by the terminal owner. If the new user's IMSI is not one for which registration is authorized, the method 200 is terminated (not shown), and the terminal returned to normal operation. In that case, terminal 110 may display a message (not shown) to the user indicating that the user associated with the entered IMSI has not been authorized to register. If the new user's IMSI is one for which registration is authorized, in step 234 the UIM generates and sends to the terminal 110 for ultimate delivery to the PMRS facility 146 (FIGS. 1 and 6) of NUHS HLR 142 (FIGS. 1 and 3) a register_new_user message 234a requesting registration of the new user. Also in step 234, the UIM records the new user IMSI and PIN in storage 118 for later use. Further in step 234, if the terminal owner elected in step 216 to replace or delete an existing registration, the UIM transmits a message (not shown) to the HLR of the home system of the user to be deleted or replaced (such as TOHS 130), causing the home system HLR to delete the record of registration in a visited system with respect to that user.

In step 236, the terminal appends the new user IMSI and PIN to the register_new_user message and forwards the message 236b to the switching center 128 of the serving system 120 over wireless link 154 or fixed link 166. This communication occurs over the normal interface (e.g. the "air-interface" in a wireless system) by which the terminal 110 normally communicates with the serving system 120. In step 238, the switching center 128 forwards the register_new_user message 238b to the VLR 124 of the serving system 120, where it is delivered to the message relay 174 of PMRS facility 126 (FIGS. 1 and 4).

It may be desirable in some systems to provide enhanced security. In such systems, it will be undesirable to transmit both the subscriber's IMSI and PIN over the air interface or through the network in a single message, or in the clear, as shown in steps 236–240 and corresponding messages 236a–240a. It is nonetheless desirable that verification occur to ensure that the PIN entered by the new user is the same as a copy of the PIN maintained for that user by the PMRS facility 146 of NUHS HLR 142. In systems where enhanced security is desired, the PIN is preferably not transmitted in steps 236–240. Instead, the PMRS facility 146 of NUHS HLR 142 may separately transmit the PIN, an encrypted version of the PIN, or another parameter encrypted using the PIN, to the terminal. See step 258. The terminal may then directly compare the user-entered PIN with the PIN supplied by the PMRS facility. However, to maximize security, it is preferable to allow verification that the PINs match, without actually sharing the PIN over the network. Thus, preferably, the PMRS facility 146 encrypts another parameter using the PIN as an encryption key. When the encrypted parameter is received by the terminal, it can be properly decrypted only if the UIM has received the correct PIN from the user. If the PIN received from the user is incorrect, the parameter will be erroneously decrypted. When that parameter (or another parameter calculated on the basis of the erroneously decrypted parameter) is returned to the PMRS facility in subsequent messages, it will be incorrect. When the PMRS facility determines that the parameter is incorrect, it preferably denies service. Although the PMRS facility may not be able to distinguish incorrect PIN entry from other errors which may affect the parameter, the desired result of denying service when an incorrect PIN is entered is achieved, advantageously without sharing the PIN over the network or the air interface. As an alternative, the PIN may be transmitted separately, preferably after encryption, to the PMRS facility 146 of NUHS HLR 142 where it may be compared with a copy of the new user's PIN maintained by the PMRS facility. See step 266.

In step 240, the PMRS facility 126 of the serving system VLR 124 forwards the register_new_user message 240a to the HLR/AC 142 of the new user's home system 140, where it is delivered to the message generator and receiver 194 of PMRS facility 146 (FIGS. 1 and 6). If the message 240a must traverse a network-to-network interface 150 or boundary, and the serving system VLR PMRS facility 126 is aware that the family type of the new user's home system is the same as the family type of the serving system, the serving system VLR PMRS facility 126 may transmit message 240a in the native format of the serving and home systems. Otherwise, the serving system VLR PMRS facility 126 must transmit message 240a in an appropriate interfamily format commonly recognized by both sender and receiver. As an alternative, the NNI 150 could provide translation between dissimilar home and serving system message formats.

In step 242, the message generator and receiver 194 of PMRS facility 146 (FIGS. 1 and 6) of NUHS HLR 142 receives and analyzes the register_new_user message. NUHS HLR PMRS facility 146 is preferably capable of interpreting messages in both the native format of the NUHS' system family or an interfamily format recognized by both the NUHS HLR PMRS facility 146 and the serving system VLR PMRS facility 126. The HLR 142 has a record of the new user's subscription, identity, and identity verification information. The NUHS HLR PMRS facility 146 optionally verifies that the new user IMSI and PIN received in the register_new_user message match those contained in the HLR records. If the new user verification fails, the new user is denied registration. Otherwise, the NUHS HLR PMRS facility 146 responds by sending a terminal_key_request message 242*a* to the serving system VLR 124, where it is delivered to the serving system VLR PMRS facility 126.

If the terminal_key_request message 242*a* must traverse a network-to-network interface 150 or boundary, and the NUHS HLR PMRS facility 146 is aware that the family type of the serving system is the same as the family type of the new user's home system, the NUHS HLR PMRS facility 146 may transmit message 242*a* in the native format of the serving and home systems. Otherwise, the NUHS HLR PMRS facility 146 must transmit message 242*a* in an appropriate interfamily format commonly recognized by both sender and receiver. As an alternative, the NNI 150 could provide translation between dissimilar home and serving system message formats.

The terminal_key_quest message includes certain information ultimately needed by the UIM 112 to calculate authentication keys to be used to obtain access to the serving system, including a modulus value parameter, a primitive value parameter, and a key generation procedure parameter. Accordingly, also in step 242, the NUHS HLR 142 generates a home-system random exponent, a modulus value parameter, and a primitive value parameter, and based thereon calculates a home system key. Several methods of generating keys and security related parameters, and exchanging them between a home system, a telecommunications terminal, and any intermediaries, are known in the art. In a preferred embodiment, these procedures may be performed substantially as described in "ANSI 41-D Enhancements for Over-The-Air Service Provisioning (OTASP) & Parameter Administration (OTAPA)", which was published in ballot form by the Engineering Subcommittee TR-45.2 of the Telecommunications Industry Association under the designation TIA/EIA PN-4173, Oct. 28, 1998, and may have been or is to be published as an interim standard under the designation IS-725-A.

In step 244, the serving system VLR PMRS facility 126 forwards the terminal_key_quest message 244*a* to the serving system switching center 128. Serving system VLR PMRS facility 126 is preferably capable of interpreting messages in both the native format of the serving system's family or an interfamily format recognized by both the serving system VLR PMRS facility 126 and the NUHS HLR PMRS facility 146. In step 246, the serving system switching center forwards the terminal_key_quest message 246*a* to the terminal 110 over wireless link 154 or fixed link 166. This communication occurs over the normal interface (e.g. the "air-interface" in a wireless system) by which the terminal 110 normally communicates with the serving system 120.

In step 248, the terminal forwards the terminal_key_request message 248*a* to the UIM 112. In step 250, the UIM calculates a terminal key (sometimes referred to as MSKEY) based on the parameters received in the terminal_key_request message 248*a*, including a modulus value parameter, a primitive value parameter, a key generation procedure parameter, and a UIM-generated random exponent, in accord with the procedures of the TIA/EIA IS-725A specification (cited previously). Also in step 250, the UIM generates a terminal_key_response message 250*a* and delivers it to the terminal 110. In step 252, the terminal forwards the terminal_key_response message 252*a* to the serving system switching center 128. In step 254, the serving system switching center 128 forwards the terminal_key_response message 254*a* to the serving system VLR PMRS facility 126. In step 256, the serving system VLR PMRS facility 126 forwards the terminal_key_response message 256*a* to the NUHS HLR PMRS facility 146. The serving system VLR PMRS facility 126 transmits the message in an appropriate format as described in connection with step 240.

In step 258, the NUHS HLR PMRS facility 146 responds by sending a generate_key_message 258*a*, including the home system key parameter previously calculated in step 242, in accord with the procedures of the TIA/EIA IS-725A specification (cited earlier), to the serving system VLR PMRS facility 126. The key (or "K") to which this message refers is the primary authentication key. NUHS HLR PMRS facility 146 transmits the message in an appropriate format as described in connection with step 242. As best seen in FIG. 3*b*, the message includes a BSKEY parameter.

In systems in which enhanced security is desired, it may be desirable to transmit an indicia of the NUHS HLR PMRS facility's copy of the new user's PIN to the terminal. Preferably, the PIN is used to encrypt the BSKEY parameter before its transmission in message 258*a*. In that way, only a receiving UIM that has the correct PIN for the new user will be able to decrypt the BSKEY. If the PIN received from the user is incorrect, the BSKEY will be erroneously decrypted, and any other parameters calculated therefrom will also be erroneous. When such parameters are transmitted to the PMRS facility, the facility can determine that the parameter is incorrect, and preferably denies service. Although the PMRS facility may not be able to distinguish incorrect PIN entry from other errors which may affect the parameter received from the terminal or UIM, the desired result of denying service when an incorrect PIN is entered is achieved, advantageously without sharing the PIN over the network or the air interface.

In step 260, the serving system VLR PMRS facility 126 forwards the generate_key message 260*a* to the serving system switching center 128. The serving system VLR PMRS facility 126 transmits the message in an appropriate format as described in connection with step 244. In step 262, the serving system switching center 128 forwards the generate_key message 262*a* to terminal 110. In step 264, the terminal 110 delivers the generate_key message 264*a* to UIM 112.

In step 266, the UIM calculates a primary authentication key based on the home system key parameter, the modulus value parameter, and the UIM-generated random exponent which was used previously in step 250 in accord with the procedures of the TIA/EIA IS-725A specification (cited previously). Also in step 266, the UIM delivers to the terminal 110 in a generate_key_response message 266*a* the terminal key calculated in step 250. Subsequently, in steps not shown but which are part of the conventional TIA/EIA IS-725A key negotiation process, the terminal key is transmitted to the home system, and the home system calculates a primary authentication key using the terminal key, the modulus value, and the home-system-generated random exponent previously used in step 242. The home-system-calculated primary authentication key is the same as the primary authentication key earlier calculated by the UIM in step 266.

As noted above, it may be desirable in some systems to provide enhanced security. In such systems, it will be undesirable to transmit both the subscriber's IMSI and PIN over the air interface or through the network in a single message, or in the clear, as shown in steps 236-240 and corresponding messages 236a–240a. It is nonetheless desirable that verification occur to ensure that the PIN entered by the new user is the same as a copy of the PIN maintained for that user by the PMRS facility 146 of NUHS HLR 142. In systems where enhanced security is desired, the PIN is preferably not transmitted in steps 236–240. To maximize security, it is preferable to allow verification that the PINs match, without actually sharing the PIN over the network. Thus, preferably, the PMRS facility 146 encrypts another parameter, such as the BSKEY parameter of step 258, message 258a, using the PIN as an encryption key. When the encrypted parameter is received by the terminal, it can be properly decrypted only if the UIM has received the correct PIN from the user. If the PIN received from the user is incorrect, the parameter will be erroneously decrypted. Similarly, in step 266, the UIM may encrypt the MSKEY parameter before transmitting it in message 266a. When the MSKEY parameter (or another parameter calculated on the basis of the incorrectly-entered PIN or the erroneously decrypted parameter) is returned to the PMRS facility, it will be incorrect. When the PMRS facility determines that the parameter is incorrect, it preferably denies service. Although the PMRS facility may not be able to distinguish incorrect PIN entry from other errors which may affect the parameter, the desired result of denying service when an incorrect PIN is entered is achieved, advantageously without sharing the PIN over the network or the air interface. As an alternative, the PIN may be transmitted separately, preferably after encryption, to the PMRS facility 146 of NUHS HLR 142 where it may be compared with a copy of the new user's PIN maintained by the PMRS facility. See step 266.

Instead, the PIN may be encrypted using the primary authentication key generated in step 266, and the encrypted PIN may be transmitted to the home system in any subsequent step. As an alternative, the PMRS facility 146 of NUHS HLR 142 may separately transmit the PIN, an encrypted version of the PIN, or another parameter encrypted using the PIN, to the terminal, thereby allowing the UIM to verify that the PIN entered by the new user is identical to the PIN copy maintained by PMRS facility 146. See step 258, in which the BSKEY parameter may be encrypted using the PIN copy maintained by the PMRS facility 146.

The method ends at oval 268. The registration of the new user may then be completed using known over-the-air registration methods (not shown), including, for example, those specified in "ANSI 41-D Enhancements for Over-The-Air Service Provisioning (OTASP) & Parameter Administration (OTAPA)", which was published in ballot form by the Engineering Subcommittee TR-45.2 of the Telecommunications Industry Association under the designation TIA/EIA PN-4173, Oct. 28, 1998, and may have been or is to be published as an interim standard under the designation IS-725A.

Thus, there has been disclosed a personal mobility registration system (PMRS) for use in conjunction with a telecommunications network and terminals therefor. The PMRS comprises apparatus and/or associated methods for registering a new user's identity and security information in a telecommunications terminal, based both on information supplied and input by the new user, and on information transferred to the terminal through the interface by which the terminal and the telecommunications network normally communicate. Advantageously, both the terminal owner and the new user must concur to enable the registration process. The registration process may occur with appropriate security even when the terminal is served by a system remote from the home system, and even when the serving system is of a family different from that of the home system.

The present application relates to telecommunications systems, which may be implemented using a variety of electronic and optical technologies, including but not limited to: analog electronic systems; digital electronic systems; microprocessors and other processing elements; and software and other embodied collections of steps, instructions, and the like, for implementing methods, processes, or policies in conjunction with such systems and processing elements. The embodiments described herein are exemplary. Thus it will be appreciated that although the embodiments are described in terms of specific technologies, other equivalent technologies could be used to implement systems in keeping with the spirit of the present invention.

The above-described embodiment of the invention is merely one example of a way in which the invention may be carried out. Other ways may also be possible and are within the scope of the following claims defining the invention.

We claim:

1. A system for effecting registration of user identity information for allowing establishment of calls for a new user in a terminal of a telecommunications network comprising:

a user identity module coupled to said terminal, said user identity module having storage means for modifiably storing information, for allowing establishment of calls, corresponding to one or more terminal users;

means in said terminal and a serving telecommunications system adapted for establishing a communications link therebetween for carrying both user message content and control/administrative traffic;

a home telecommunications system associated with said new user and in communication with said serving telecommunications system, said home telecommunications system having a home location register, said home location register having an authentication key information generator;

said terminal having a user interface for receiving, from said new user, user identity information, user verification information, and a request for registration;

said terminal operative in response to said request for registration and in cooperation with said user identity module to transmit via a communications link established by said establishing means a message destined for said home location register including said user identity and user verification information for said new user;

said home location register and said authentication key information generator operative in response to said message to generate authentication key information corresponding to said new user and to transmit via said communications link and destined for said user identity module said authentication key information corresponding to said new user; and said user identity module operative in response to said authentication key information corresponding to said new user to generate a primary authentication key corresponding to said new user and to store said user identity information and said primary authentication key in said storage means.

2. The system of claim 1 wherein said serving telecommunications system provides wireless telecommunications service, and said terminal is a wireless telecommunications terminal.

3. The system of claim 2 wherein said communications link is a wireless communications link.

4. The system of claim 1 wherein said serving telecommunications system provides wired telecommunications service and said terminal is a wired telecommunications terminal.

5. The system of claim 4 wherein said communications link is a line interconnecting serving telecommunications system and said wired telecommunications terminal.

6. The system of claim 1,
   said storage means of said user identity module further containing means for storing user identity information and user verification information corresponding to a person authorized to control access to said terminal; and
   said user interface being adapted to receive from said terminal owner an authorization to register user identity information for said new user, user identity information corresponding to said owner of said terminal, and user verification information corresponding to said owner of said terminal;
   and said user identity module and said terminal being adapted to cooperatively determine whether said user identity and user verification information received from said terminal owner matches said user identity and user verification information contained in said storage.

7. The system of claim 6,
   said home location register further comprising means for storing user identity information and user verification information corresponding to said new user; and
   said home location register determining whether said user identity and user verification information of said new user received from said terminal corresponds to said user identity and user verification information contained in said means for storing user identity and user verification information.

8. The system of claim 1 wherein said serving system is a member of a first system family and said home system is a member of a second system family different from said first system family; said first system family employing a first intrasystem message format; said second system family employing a second intrasystem message format; said serving system and said home system communicating in an interfamily message format different from said first and second intrasystem message formats.

9. The system of claim 1 wherein said serving system employs a first intrasystem message format; said serving system and said home system communicating in an interfamily message format different from said first intrasystem message format.

10. The system of claim 9 wherein said home system employs a second intrasystem message format; said serving system and said home system communicating in an interfamily message format different from said first and second intrasystem message formats.

11. A method for use in a telecommunications terminal for registering identity information for allowing establishment of calls for a new user in a telecommunications terminal, at least one preexisting registered user identity of a terminal owner being associated with the terminal, comprising the steps of:

(a) receiving from the terminal owner information to verify the identity of the terminal owner and a request to register the identity of the new user;
   (b) receiving information to verify the identity of the new user and a request to register the identity, for allowing establishment of calls, of the new user;
   (c) determining whether there was a match between said information to verify the identity of the terminal owner and said registered user identity of the terminal owner;
   (d) if said determining step indicated that a match exists between said information to verify the identity of the terminal owner and said registered user identity of the terminal owner, transmitting a first message destined for a home system of said new user advising that the identity of the new user is to be registered in said terminal;
   (e) receiving a second message from said home system including at least one parameter needed by the terminal to access said telecommunications system under the identity of the new user; and
   (f) storing in the terminal said identity of the new user and an authentication key associated with said at least one parameter.

12. The method of claim 11 further comprising the step of calculating said authentication key based on a home system key parameter, a modulus value parameter, and a random exponent.

\* \* \* \* \*